US005120597A

United States Patent [19]

Takimoto et al.

[11] Patent Number: 5,120,597

[45] Date of Patent: Jun. 9, 1992

[54] PRESS-CUSHION SHEET

[75] Inventors: Noboru Takimoto, Yao; Syuichi Shimeno, Yamatokoriyama; Makoto Tanaka, Toyonaka; Tadashi Seki, Osaka, all of Japan

[73] Assignee: Teijin Limited, Osaka, Japan

[21] Appl. No.: 791,109

[22] Filed: Nov. 13, 1991

[30] Foreign Application Priority Data

Nov. 28, 1990 [JP] Japan .................................. 2-323103

[51] Int. Cl.[5] .................................................. B32B 7/00

[52] U.S. Cl. ................................ 428/246; 139/420 R; 428/257; 428/260; 428/901; 428/902

[58] Field of Search .................... 139/420 R; 428/246, 428/257, 260, 902, 901

[56] References Cited

U.S. PATENT DOCUMENTS 4,922,969 5/1990 Campman et al. .............. 139/420 R

*Primary Examiner*—James J. Bell

*Attorney, Agent, or Firm*—Sughrue, Mion, Zinn, Macpeak & Seas

[57] ABSTRACT

A press-cushion sheet having an enhanced durability in practical use comprises a three- to six-ply woven fabric composed of heat resistant fiber spun warp and weft yarns with a cotton count of 2 to 10 and having warp and weft densities of 80–170 yarns/2.54 cm and 50–160 yarns/2.54 cm respectively, the individual warp yarns in the fabric are bent in the form of waves and have a bending coefficient (BC) of from 1 to 30 determined in accordance with the equation (I):

$$BC = \frac{n}{d}$$

wherein d represents a thickness of the fabric and n represents the wave number of the warp yarns bent in the form of waves, per 10 cm of the fabric, and optionally, a heat-resistance resin impregnated in the fabric.

8 Claims, 1 Drawing Sheet

PRESS-CUSHION SHEET

BACKGROUND OF THE INVENTION

1. Field of the Invention

The present invention relates to a press-cushion sheet. More particularly, the present invention relates to a press-cushion sheet usable for hot-press machines for producing laminate plates, for example, decorative laminates or printed circuit boards.

2. Description of the Related Art

In a press-molding process by a hot press machine, a press-cushion sheet is arranged between a heating plate and a molding plate, to uniformly apply a heat and pressure to the surface of the material to be press-molded and to correct a stress of the pressed material derived from the heating plate.

In the conventional process, various felt sheets, rubber sheets and kraft paper sheets are employed as press-cushion sheets, but it is known that the felt press-cushion sheet does not have a uniform density distribution, and thus it is difficult to apply a uniform press-heating treatment to the material to be pressed. Also, the rubber press-cushion sheets are easily deteriorated under high temperature pressing condition, for example, at a temperature of from 160° C. to 220° C. under a pressure of from 40 to 120 kg/cm$^2$, and thus the cushioning performance of the rubber sheet is lowered and the rubber sheet per se is deformed. Further, since the kraft paper press-cushion sheet is provided by superimposing 10 to 20 individual paper sheets one on the other, and the individual paper sheets are frequently broken, a superimposing of the individual paper sheets and exchange of the broken paper sheets for fresh sheets become necessary, and thus the pressing procedure exhibits a poor operating efficiency.

Known press-cushion sheets other than the kraft paper press-cushion sheets are made from woven fabrics, nonwoven fabrics, felt sheets and synthetic paper sheets composed of organic fibers or inorganic fibers.

Japanese Unexamined Patent Publication No. 59-192,795 discloses a press-cushion sheet produced by laminating a plurality of wet synthetic paper sheets each composed of inorganic fibers having a length of 70 to 1000 μm and aramid pulp particles having a freeness of 150 seconds or more but less than 500 seconds, and heat-pressing the resultant wet laminate.

Japanese Unexamined Patent Publication No. 58-7,646 discloses a press-cushion sheet comprising a hard cushion layer composed of a heat resistant fiber nonwoven fabric impregnated with a cured resin or rubber and a soft cushion layer composed of a heat resistant fiber nonwoven fabric bonded to a surface of the hard cushion layer through an adhesive layer, and having a releasing layer formed on the surface thereof.

Japanese Unexamined Patent Publication No. 55-101,224 discloses a heat-treated press-cushion sheet comprising a plurality of woven fabrics and plurality of pad fiber layers and laminated together by needle-punching.

The above-mentioned conventional press-cushion sheets are disadvantageous in that the production process is complicated and the durability of the resultant cushion sheet in practical use is not satisfactory.

SUMMARY OF THE INVENTION

An object of the present invention is to provide a press-cushion sheet having an enhanced durability in practical use and capable of being produced by a simple process.

The above-mentioned object can be attained by the press-cushion sheet of the present invention comprising a multiple-ply woven fabric having a three to six ply weave structure and composed of warps and wefts consisting of heat resistant fiber spun yarns with a metric count of 2 to 10 and having a warp density of from 80 to 170 yarns/2.54 cm and a weft density of from 50 to 160 yarns/2.54 cm, the warp yarns being bent in the form of waves in the three to six ply weave structure, and having a bending coefficient of from 1 to 30 determined in accordance with the equation (I):

$$BC = n/d \qquad (I)$$

wherein BC represents the bending coefficient of each warp yarn, d represents a thickness in mm of the multiple-ply woven fabric and n represents the wave number of the bent warp yarns in the form of waves, per 10 cm of the multiple-ply woven fabric in the warp direction thereof.

In the press-cushion sheet of the present invention, the multiple-ply woven fabric is optionally impregnated with a cured heat-resistant resin.

DESCRIPTION OF THE PREFERRED EMBODIMENTS

Figure 1:
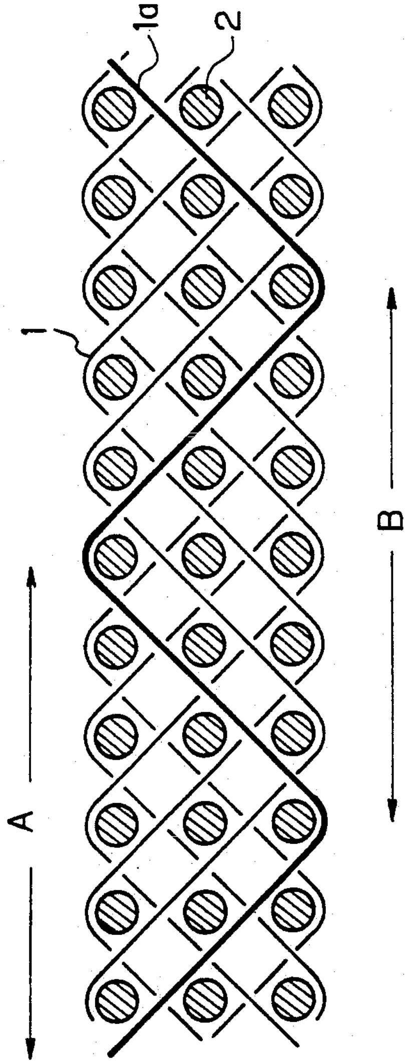
FIG. 1 is an explanatory cross-sectional view of an embodiment of the multiple-ply woven fabric usable for the present invention.

The press-cushion sheet of the present invention comprises a multiple-ply woven fabric having a three to six ply weave structure and composed of warp and wefts consisting of heat resistant fiber spun yarns with a cotton count of 2 to 10.

The spun yarns usable for the warp and wefts of the multiple woven fabric are composed of heat-resistant staple fibers having a satisfactory resistance to a high pressure and a high temperature used in a heat-pressing procedure for which the press-cushion sheet is to be employed. The heat resistant staple fibers are selected from heat resistant organic synthetic staple fibers and inorganic fibers.

The heat-resistant organic synthetic fibers are selected from, for example, the group consisting of aramid fibers (namely wholly aromatic polyamide fibers), polyetheretherketone fibers polyphenylsulfone fibers and phenol fibers.

The inorganic fibers are selected from, for example, the group consisting of carbon fibers, glass fibers and metallic fibers, for example, stainless steel fibers.

The spun yarns usable for the present invention are not limited to those consisting of only heat-resistant fibers, and may contain fibers other than the heat-resistant fibers as long as the resultant spun yarns exhibit a satisfactory heat resistance in the practical heat-pressing procedure.

The warp and weft yarns for the heat-resistant fiber woven fabric have a cotton count of from 2 to 10. Note, as long as the cotton count is in the above-mentioned range, the warp and weft yarns may be single yarns, double yarns or other multiple yarns.

When the cotton count is more than 10 the resultant warp weft yarns are too thin, and thus the resultant press-cushion sheet has an undesirable small thickness by which a satisfactory cushioning effect cannot be obtained.

When the cotton count is less than 2, it becomes difficult to impart the necessary warp and weft densities to the resultant woven fabric.

In the woven fabric, the warp density is from 80 to 170 yarns/2.54 cm.

If the warp density is more than 170 yarns/2.54 cm, it becomes difficult to obtain a completed multiple-ply weave structure, and the weaving operation also becomes difficult.

If the warp density is less than 80 yarns/2.54 cm the resultant woven fabric has an uneven weave structure, and thus the thickness of the resultant multiple-ply woven fabric becomes non-uniform.

Also, in the woven fabric, the weft density is from 50 to 160 yarns/2.54 cm.

If the weft density is more than 160 yarns/2.54 cm, it is difficult to obtain a completed multiple-ply weaving structure, and the weaving operation also becomes difficult.

If the weft density is less than 50 yarns/2.54 cm the resultant multiple-ply woven fabric has an uneven weave structure, and thus the thickness of the resultant woven fabric becomes non-uniform.

In the multiple-ply woven fabric usable for the present invention, the warp yarns are bent in the form of waves in the three to six ply weave structure, and has a bending coefficient of 1 to 30 determined in accordance with the equation (I):

$$BC = n/d \qquad (I)$$

wherein BC represents a bending coefficient of each warp yarn, d represents a thickness of the woven fabric, and n represents the wave number of the bent warp yarns in the form of waves, per 10 cm of the woven fabric in the warp direction thereof.

The thickness (d) of the woven fabric is measured by a customary method, for example, in accordance with ASTM D 1774-64.

The number (n) of bends is measured in such a manner that a woven fabric is cut along a warp yarn to be measured, an enlarged photograph of the cut side face of the woven fabric is taken, and the wave-number of the bent warp yarn in the form of waves per 10 cm of the woven fabric in the warp direction thereof is counted on the photograph. In another measurement manner, the warp yarn to be measured is withdrawn from the cut woven fabric, while maintaining the bent form of the warp yarn, and the number of wave number of the bent warp yarn in the form of waves is counted per 10 cm of the woven fabric in the warp direction thereof.

The measurement is repeated for ten warp yarns, and the value of n is indicated by an average of the measured ten values.

Referring to FIG. 1 showing an explanatory cross-section of a three ply woven fabric, a plurality of warp yarns 1 are bent in the form of waves while repeatedly passing from a surface side to the opposite surface side of the fabric through a plurality of the weft yarns 2.

With respect to one warp yarn 1*a*, FIG. 1 shows two waves of the warp yarn 1*a*. In a region A, a portion of the warp yarn 1*a* holds a weft yarn group consisting of 9 weft yarns without restricting the weft yarns. Also, in the opposite side region B, a weft yarn group consisting of 9 weft yarns is covered by a portion of the warp yarns 1*a* without being restricted by the warp yarn 1*a*. Accordingly, in each weft yarn group, the individual weft yarns have an enhanced freedom of movement relative to each other, and accordingly, the multiple-ply woven fabric exhibits an enhanced cushioning performance.

If the bending coefficient is more than 30 it becomes difficult to obtain a satisfactory weft density, and thus the resultant woven fabric has an unsatisfactorily small thickness and the resultant press-cushion sheet exhibits an unsatisfactory cushioning performance.

If the bending coefficient is less than 1, it becomes difficult to obtain a desired completed multiple-ply weave structure, and the weaving operation also becomes difficult.

In the press-cushion sheet of the present invention, the multiple-ply woven fabric is optionally impregnated with a heat-resistant resin and cured. The heat resistant resin is selected from, for example, the group consisting of aramid resins (namely aromatic wholly polyamide resins, for example, poly (m-phenylene isophthal amide) resin, polyimide resins, polyphenylsulfone resins, melamine-formaldehyde resins, silicone acrylic resins and epoxy resins.

The heat resistant resin is applied in the form of a dope solution having a concentration of from 1 to 10% by weight in an organic solvent, to the multiple woven fabric. The dry weight of the heat resistant resin impregnated in the multiple-ply woven fabric is preferably from 1% to 10% based on the weight of the multiple woven fabric.

The organic solvent comprises at least one polar solvent selected from the group consisting of dimethylformamide, N-methyl-2-pyrrolidone, and dimethylformamide, dependent on the type of the heat resistant resin.

The multiple woven fabric is impregnated with the dope solution of the heat resistant resin and then dried. When the heat resistant resin is the poly (m-phenylene isophthalamide), the dope solution impregnated in the multiple woven fabric is dried and cured, preferably at a temperature of from 100° C. to 250° C.

The impregnation of the multiple-ply woven fabric with the heat resistant resin is effective for stabilizing the weave structure of the multiple woven fabric and for enhancing the surface smoothness of the resultant press-cushion sheet.

The multiple-ply woven fabric is optionally heat-treated at a temperature of from 200° C. to 400° C. preferably for a time of 1 to 5 minute. This heat treatment is also effective for stabilizing the weave structure of the multiple-ply woven fabric and for improving the surface smoothness of the resultant press-cushion sheet.

In practical use, during the heat-pressing procedure, the press-cushion sheet may be used as a single sheet alone or as a plurality of the press-cushion sheets superimposed one on the other. For example, a press-cushion sheet comprising a triple woven fabric is superimposed on another press-cushion sheet comprising a four-ply woven fabric.

When a plurality of press-cushion sheets are used while superimposed one on the other, and if a moire phenomenon occurs on the resultant pressed product, due to an interference of the surface structures of the superimposed press-cushion sheets, the quality of the product is affected by the moire phenomenon, and thus at least one moire-preventing sheet is interposed between the press-cushion sheets. The moire-preventing sheet is composed of a plain weave having a surface structure different from that of the multiple-ply woven fabrics in the press-cushion sheets, or a kraft paper sheet or a felt sheet.

The press-cushion sheet of the present invention can be produced by a simple process, in comparison with the processes for producing the conventional press-cushion sheets, and exhibits an enhanced cushioning performance and an improved durability in practical use. Therefore, the press-cushion sheet of the present invention can be repeatedly used over a long time, and accordingly, by using the press-cushion sheet of the present invention, the operational efficiency of the hot press proves and the quality of the resultant hot pressed product can be significantly improved.

EXAMPLE

The present invention will be further explained by the following examples.

EXAMPLE 1

A multiple-ply woven fabric having a four-ply weave structure with a warp density of 109 yarns/2.54 cm and a weft density of 87 yarns/2.54 cm was produced from the following warps and wefts.

The warps consisted of twisted triple spun yarns prepared by paralleling and twisting three single spun yarns composed of poly (m-phenylene isophthalamide) staple fibers with an individual fiber denier of 2 and a length of 51 mm, and having a cotton yarn count of 10, at a twist number of 390 turns/m.

The wefts consisted of twisted double spun yarns prepared by doubling and twisting two of the same single spun yarns as mentioned above, at a twist number of 200 turns/m.

The resultant multiple woven fabric had a basis weight of 1136 $g/m^2$ and a thickness of 2.6 mm.

The woven fabric was impregnated with a dope solution of 3% by weight of a poly (m-phenylene isophthalamide) resin in a polar solvent consisting of a mixture of dimethyl formamide with dimethylacetamide in a mixing weight ratio of 50:50 and then the impregnated woven fabric was dried and cured at a temperature of 200° C. for 2 minutes.

The resultant press-cushion sheet contained the cured poly (m-phenylene isophthalamide resin in a weight of 3% based on the weight of the woven fabric and had a weight of 1170 $g/m^2$.

In this press-cushion sheet, the warp yarns in the woven fabric had a bending coefficient of 3.11.

The press-cushion sheet had a satisfactory surface smoothness and an excellent stability of the weave structure.

The press-cushion sheet was employed on a hot pressing machine for producing a base plate of a printed circuit board at a temperature of 180° C. under a pressure of 100 $kg/cm^2$, and the press cushion sheet was repeatedly used 2000 times or more, under the above-mentioned hot pressing conditions.

In comparison, a conventional felt or rubber press-cushion sheet was repeatedly employed only 500 times or less, under the same hot pressing conditions as mentioned above.

When a kraft paper press-cushion sheet composed of 10 individual paper sheets was used, several individual paper sheets were broken at every hot pressing operation and had to be replaced with fresh individual paper sheets.

From the above-mentioned comparison, it was confirmed that the press-cushion sheet of the present invention exhibited a superior durability and operation efficiency in practical use, compared with the conventional press-cushion sheets.

EXAMPLE 2

A multiple-ply woven fabric having a three ply weave structure with warp density of 93 yarns/2.54 cm and a weft density of 66 yarns/2.54 cm was produced from the following warps and wefts.

The warps consisted of twisted double yarns prepared by doubling and twisting two single single spun yarns composed of poly (m-phenylene isophthalamide) staple fibers with an individual fiber denier of 1.5 and a length of 51 mm and having a cotton yarn count of 10, at a twist number of 390 turns/m.

The wefts consisted of twisted triple yarns prepared by paralleling and twisting three of the same single spun yarns as mentioned above, at a twist number of 200 turns/m.

The resultant woven fabric had a basis weight of 930 $g/m^2$ and a thickness of 2.3 mm, and the warp yarns in the fabric had a bending coefficient of 5.84.

This woven fabric was employed as a press-cushion sheet on a hot pressing machine for producing decorated plates consisting of a polyvinyl chloride resin at a temperature of 180° C. under a pressure of 40 $kg/cm^2$.

It was confirmed that the press-cushion sheet exhibited a durability against repeated hot pressing operations of three times or more that of the conventional press-cushion sheets.

EXAMPLE 3

A multiple-ply woven fabric having the same four-ply weave structure and warp and weft densities as those in Example 1 was produced from the following warps and wefts.

The warps consisted of twisted double blended spun yarns prepared by doubling and twisting two single blended spun yarns composed of 80% by weight of poly (m-phenylene isophthalamide) fibers having an individual fiber denier of 2 and a length of 51 mm and 20% by weight of carbon fibers having an individual fiber diameter of 7 μm and a length of 50 mm, and having a cotton yarn count of 10, at a twist number of 390 turns/m.

The wefts consisted of twisted triple blended spun yarns prepared by paralleling and twisting three of the some single blended spun yarns as mentioned above, at a twist number of 200 turns/m.

The resultant multiple woven fabric had a basis weight of 1130 $g/m^2$ and a thickness of 2.6 mm.

The multiple-ply woven fabric was impregnated with a dope solution consisting of an aqueous solution of 5% by weight of a melamine-formaldehyde resin, and the impregnated woven fabric was dried and cured at a temperature of 200° C. for 2 minutes.

The resultant press-cushion sheet contained the cured resin in a weight of 5% based on the weight of the woven fabric, and had a weight of 1190 $g/m^2$.

In this press-cushion sheet, the warp yarns had a bending coefficient of 3.11.

This press-cushion sheet was repeatedly employed at a high stability for hot pressing operations at a temperature of 170° to 180° C., i.e., 10° C. to 20° C. higher than a customary hot pressing temperature.

EXAMPLE 4

A multiple-ply woven fabric having a six-ply weave structure with a warp density of 153 yarns/2.54 cm and a weft density of 145 yarns/2.54 cm was produced from the following warps and wefts.

The warps consisted of twisted double spun yarns prepared by doubling and twisting two single spun yarns composed of poly (m-phenylene isophthalamide) staple fibers with an individual fiber denier of 2 and a length of 51 mm, and having a cotton yarn count of 10, at a twist number of 390 turns/m.

The wefts consisted of twisted triple spun yarns prepared by paralleling and twisting three of the same single spun yarns as mentioned above, at a twist number of 200 turns/m.

The multiple-ply woven fabric was heat-treated at a temperature of 350° C. for 2 minutes.

The resultant press-cushion sheet had a basis weight of 2,060 g/m$^2$ and a thickness of 3.5 mm and the warps of the woven fabric had a bending coefficient of 1.64.

The press-cushion sheet was employed as a single sheet on a hot pressing machine for producing decorated polyvinyl chloride resin plates, without difficulty, whereas a conventional press-cushion sheet was provided by superimposing two triple woven fabrics one on the other for the same hot pressing process as mentioned above.

Accordingly, the use of the press-cushion sheet of the present invention resulted in an increase in the operation coefficient of 15%.

EXAMPLE 5

A moire-preventing plain weave was produced from warps and wefts consisting of double spun yarns composed of poly(m-phenylene isophthalamide) staple fibers with an individual fiber denier of 2 and a length of 51 mm and having a cotton yarn count of 30/2, at a warp density of 60 yarns/2.54 cm and at a weft density of 46 yarns/2.54 cm.

A laminated press-cushion sheet was produced by interposing the moire-preventing plain weave between two of the same four-ply woven fabrics as in Example 1.

The laminated press-cushion sheet was repeatedly employed on a hot pressing machine for producing laminated base plates of printed circuit boards at a hot pressing temperature of 180° C. under a pressure of 100 kg/cm$^2$.

It was confirmed that when the laminated press cushion sheet was employed 1500 times or more in the hot pressing operation, no breaking of the laminated press-cushion sheet occurred, and no moire was formed on the resultant laminated base plates.

We claim:

1. A press-cushion sheet comprising a multiple-ply woven fabric having three- to six-ply weave structure and composed of warps and wefts consisting of heat-resistant fiber spun yarns with a cotton count of 2 to 10 and having a warp density of from 80 to 70 yarns/2.54 cm and a weft density of from 50 to 60 yarns/2.54 cm, said warp yarns being bent in the form of waves in the three- to six-ply weave structure, and having a bending coefficient of from 1 to 30 determined in accordance with the equation (I):

$$BC = \frac{n}{d} \tag{I}$$

wherein BC represents the bending coefficient of each warp yarn, d represents a thickness in mm of the multi-ple-ply woven fabric and n represents the wave number of the warp yarns bent in the form of waves, per 10 cm of the multiple-ply woven fabric in the warp direction thereof.

2. The press-cushion sheet as claimed in claim 1, wherein the heat resistant fiber spun warp and weft yarns comprise at least one type of fibers selected from the group consisting of heat resistant organic synthetic fibers and inorganic fibers.

3. The press-cushion sheet as claimed in claim 2, wherein the heat resistant organic fibers are selected from the group consisting of aramid fibers, polyetheretherketone fibers, polyphenylsulfone fibers and phenol fibers.

4. The press-cushion sheet as claimed in claim 2, wherein the heat resistant inorganic fibers are selected from the group consisting of carbon fibers, glass fibers and metallic fibers.

5. The press cushion sheet as claimed in claim 1, wherein the multiple-ply woven fabric is one-dimensionally stabilized by a heat treatment at a temperature of 200° C. to 400° C.

6. The press-cushion sheet as claimed in claim 1, wherein the multiple-ply woven fabric is impregnated with a heat resistant resin.

7. The press-cushion sheet as claimed in claim 6, wherein the heat resistance resin comprises at least one member selected from the group consisting of aromatic polyamide resins, polyimide resins, polyphenylsulfone resins, melamine-formaldehyde resins, silicone-acrylic resins and epoxy resins.

8. The press-cushion sheet as claimed in claim 1, wherein the heat resistant resin impregnated in the multiple-ply woven fabric is in an amount of 1 to 10% based on the weight of the multiple woven fabric.

* * * * *